(12) United States Patent
Bryll

(10) Patent No.: US 9,830,694 B2
(45) Date of Patent: Nov. 28, 2017

(54) MULTI-LEVEL IMAGE FOCUS USING A TUNABLE LENS IN A MACHINE VISION INSPECTION SYSTEM

(71) Applicant: Mitutoyo Corporation, Kanagawa (JP)

(72) Inventor: Robert Kamil Bryll, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 298 days.

(21) Appl. No.: 14/841,051

(22) Filed: Aug. 31, 2015

(65) Prior Publication Data

US 2017/0061601 A1    Mar. 2, 2017

(51) Int. Cl.
*H04N 5/235* (2006.01)
*G06T 7/00* (2017.01)
(Continued)

(52) U.S. Cl.
CPC .......... *G06T 7/0004* (2013.01); *G02B 3/0081* (2013.01); *G02B 3/0087* (2013.01); *G02B 21/0016* (2013.01); *G02B 21/367* (2013.01); *G02F 1/33* (2013.01); *G06F 3/04842* (2013.01); *G06K 9/66* (2013.01); *G06T 5/003* (2013.01); *G06T 5/50* (2013.01); *H04N 5/2256* (2013.01); *H04N 5/2353* (2013.01); *H04N 5/23212* (2013.01); *G02B 21/0084* (2013.01);
(Continued)

(58) Field of Classification Search
CPC ........ G06T 7/0004; G06T 2207/10152; H04N 5/23212; H04N 5/2256; H04N 5/2354; G02B 3/0081; G02B 3/0087; G02B 21/0016; G02B 21/0084
See application file for complete search history.

(56) References Cited

U.S. PATENT DOCUMENTS 6,542,180 B1    4/2003  Wasserman et al.
7,324,682 B2    1/2008  Wasserman
(Continued)

OTHER PUBLICATIONS

Aschwanden, "Autofocus microscope with a constant numerical aperture (NA) and field of view (FOV)," Optotune AG, Oct. 2013, 6 pages.
(Continued)

*Primary Examiner* — Obafemi Sosanya
(74) *Attorney, Agent, or Firm* — Seed IP Law Group LLP

(57) ABSTRACT

A method is provided for defining operations for acquiring a multi-exposure image of a workpiece including first and second regions of interest at different Z heights. The multi-exposure image is acquired by a machine vision inspection system including strobed illumination and a variable focal length lens (e.g., a tunable acoustic gradient index of refraction lens) used for periodically modulating a focus position. During a learn mode, first and second multi-exposure timing values for instances of strobed illumination are determined that correspond with first and second phase timings of the periodically modulated focus position that produce sufficient image focus for the first and second regions of interest. Data indicative of the multi-exposure timing difference is recorded and is subsequently utilized (e.g., during a run mode) to define operations for acquiring a multi-exposure image of first and second regions of interest on a current workpiece that is similar to the representative workpiece.

20 Claims, 10 Drawing Sheets

(51) Int. Cl.
| | |
|---|---|
| *G02B 3/00* | (2006.01) |
| *G02F 1/33* | (2006.01) |
| *G06F 3/0484* | (2013.01) |
| *G06K 9/66* | (2006.01) |
| *H04N 5/225* | (2006.01) |
| *H04N 5/232* | (2006.01) |
| *G02B 21/00* | (2006.01) |
| *G02B 21/36* | (2006.01) |
| *G06T 5/00* | (2006.01) |
| *G06T 5/50* | (2006.01) |
| *G05B 19/401* | (2006.01) |
| *G02F 1/29* | (2006.01) |

(52) U.S. Cl.
CPC ............... *G02F 2001/294* (2013.01); *G06T 2207/10148* (2013.01); *G06T 2207/30164* (2013.01)

(56) References Cited

U.S. PATENT DOCUMENTS

| | | | |
|---|---|---|---|
| 7,454,053 | B2 | 11/2008 | Bryll et al. |
| 7,567,713 | B2 | 7/2009 | Ding |
| 7,570,795 | B2 | 8/2009 | Yu et al. |
| 7,626,705 | B2 | 12/2009 | Altendorf |
| 7,627,162 | B2 | 12/2009 | Blanford et al. |
| 7,668,388 | B2 | 2/2010 | Bryll |
| 7,723,657 | B2 | 5/2010 | Altendorf et al. |
| 7,728,961 | B2 | 6/2010 | Watson |
| 7,769,222 | B2 | 8/2010 | Blanford, Jr. et al. |
| 8,111,905 | B2 | 2/2012 | Campbell |
| 8,111,938 | B2 | 2/2012 | Bryll et al. |
| 8,194,307 | B2 | 6/2012 | Arnold et al. |
| 8,212,997 | B1 | 7/2012 | Xie |
| 8,269,830 | B1 | 9/2012 | Delaney |
| 8,581,162 | B2 | 11/2013 | Campbell |
| 8,587,772 | B2 | 11/2013 | Sesko et al. |
| 8,587,789 | B2 | 11/2013 | Sesko |
| 8,860,931 | B2 | 10/2014 | Patzwald |
| 8,902,307 | B2 * | 12/2014 | Delaney ............... G05B 19/401 348/86 |
| 8,917,940 | B2 | 12/2014 | Bryll |
| 8,957,960 | B2 | 2/2015 | Saylor et al. |
| 9,013,574 | B2 | 4/2015 | Saylor et al. |
| 9,060,117 | B2 | 6/2015 | Bryll et al. |
| 9,143,674 | B2 | 9/2015 | Gladnick |
| 9,736,355 | B1 * | 8/2017 | Bryll ................... H04N 5/23212 |
| 2011/0103679 | A1 * | 5/2011 | Campbell .......... G01B 11/0608 382/152 |
| 2013/0027538 | A1 | 1/2013 | Ding et al. |
| 2013/0141782 | A1 | 6/2013 | Theriault et al. |
| 2013/0148196 | A1 | 6/2013 | Arnold |
| 2013/0162806 | A1 | 6/2013 | Ding et al. |
| 2013/0162807 | A1 * | 6/2013 | Bryll ..................... H04N 5/235 348/86 |
| 2013/0321927 | A1 | 12/2013 | Arnold et al. |
| 2014/0036346 | A1 | 2/2014 | Arnold et al. |
| 2014/0168752 | A1 | 6/2014 | Arnold et al. |
| 2014/0211299 | A1 | 7/2014 | Arnold et al. |
| 2014/0294284 | A1 | 10/2014 | Bryll |
| 2014/0300726 | A1 | 10/2014 | Gladnick |
| 2014/0368726 | A1 | 12/2014 | Gladnick |
| 2015/0009484 | A1 | 1/2015 | Sesko |
| 2015/0015696 | A1 | 1/2015 | Delaney |
| 2015/0145980 | A1 | 5/2015 | Bryll |

OTHER PUBLICATIONS

Blum et al., "Compact optical design solutions using focus tunable lenses," SPIE Optical Design and Engineering IV, Proceeding vol. 8167, Sep. 22, 2011, 9 pages.

Chen et al., "Remote focal scanning optical projection tomography with an electrically tunable lens," Biomedical Optics Express, vol. 5(10), Oct. 2014, 9 pages.

Duocastella et al., "Simultaneous imaging of multiple focal planes for three-dimensional microscopy using ultra-high-speed adaptive optics," SPIE, Journal of Biomedical Optics, May 2012, 4 pages.

Fahrbach et al., "Rapid 3D light-sheet microscopy with a tunable lens," Optics Express, vol. 21(18), Sep. 9, 2013, 17 pages.

Lipp et al., "Rapid Beam Shaping and Focussing Using Tunable Acoustic Gradient Index Lenses," Department of Mechanical and Aerospace Engineering, May 4-9, 2008, 5 pages.

McLeod et al., "Mechanics and refractive power optimization of tunable acoustic gradient lenses," Journal of Applied Physics 102, 033104 (2007), Aug. 8, 2007, 9 pages.

Mermillod-Blondin et al., "High-speed varifocal imaging with a tunable acoustic gradient index of refraction lens," Optics Letters, vol. 33(18), Princeton, New Jersey, Sep. 15, 2008, 3 pages.

Nagahara et al., "Flexible Depth of Field Photography," Proceedings of the European Conference on Computer Vision, Oct. 2008, 14 pages.

Olivier et al., "Two-photon microscopy with simultaneous standard and extended depth of field using a tunable acoustic gradient-index lens," Optical Society of America, Optics Letters, vol. 34(11), Jun. 1, 2009, 3 pages.

Optotune AG, "Optical focusing in microscopy with Optotune's focus tunable lens EL-10-30," Application Note, Sep. 2011, 13 pages.

Tag Optics Inc., "The Physics Behind Tag Optics' Technology and the Mechanism of Action of Using Sound to Shape Light," Application Notice 12-001, Physics Behind the TAG Technology, Mar. 2013, 6 pages.

"QVPAK 3D CNC Vision Measuring Machine Operation Guide," Version 2.0, published Sep. 1996, 86 pages.

"QVPAK 3D CNC Vision Measuring Machine User's Guide," Version 7, published Jan. 2003, 217 pages.

Gladnick, U.S. Appl. No. 14/795,409, filed Jul. 9, 2015, "Adaptable Operating Frequency of Variable Focal Length Lens in an Adjustable Magnification Optical System," 58 pages.

* cited by examiner

MULTI-LEVEL IMAGE FOCUS USING A TUNABLE LENS IN A MACHINE VISION INSPECTION SYSTEM

BACKGROUND

Technical Field

This disclosure relates to precision metrology, and more particularly to machine vision inspection systems in which a variable focal length lens may be utilized to periodically modulate a focus position.

Description of the Related Art

Precision machine vision inspection systems (or "vision systems" for short) may be used for precise measurements of objects and to inspect other object characteristics. Such systems may include a computer, camera, optical system, and a stage that moves to allow workpiece traversal. One exemplary system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of small or large workpieces at various magnifications.

Such machine vision inspection systems are generally programmable to provide automated inspection. The machine control instructions including the specific inspection event sequence—i.e., sequential image acquisition settings (e.g., position, lighting, magnification, etc.) and how to analyze/inspect each image (e.g., using one or more video tools) are stored as a "part program" or "workpiece program" that is specific to the particular workpiece configuration.

Video tools (or "tools" for short) and other graphical user interface (GUI) features allow operations and programming by "non-expert" operators. Such tools may be used manually in "manual mode", and/or their parameters and operation can also be recorded during learn mode, in order to create part programs. Video tools may include, for example, edge-/boundary-detection tools, autofocus tools, shape- or pattern-matching tools, dimension-measuring tools, and the like. U.S. Pat. No. 6,542,180, which is hereby incorporated herein by reference in its entirety, teaches a vision system including the use of video tools for inspection programming.

In some applications, it is desirable to operate an imaging system of a machine vision inspection system to collect an image with an extended depth of field (EDOF), that is larger than that provided by the optical imaging system at a single focus position. Various methods are known for collecting an EDOF image. One method collects an image "stack," consisting of a plurality of congruent or aligned images focused at different distances throughout a focus range. A composite image is constructed, wherein each portion of the field of view is extracted from the particular image that shows that portion with the best focus. However, this method is relatively slow. As another example, Nagahara et al. ("Flexible Depth of Field Photography", Proceedings of the European Conference on Computer Vision, October 2008) discloses a method wherein a single image is exposed along a plurality of focus distances during its exposure time. This image is relatively blurry, but it is deconvolved using a known or predetermined blur kernel to obtain a relatively clear EDOF image. In the disclosed method, the focal distance is altered by translating the detector along an optical axis of an imaging system. This method is also relatively slow and mechanically complex. An improved method for providing images with features at different focus distances is desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method is provided for defining operations that control acquisition of a multi-exposure image provided by an instance of a type of machine vision inspection system. The machine vision inspection system comprises an illumination source for providing strobed illumination and an imaging system including a variable focal length lens (e.g., a tunable acoustic gradient index of refraction lens) that is utilized to periodically modulate a focus position of the imaging system over a plurality of positions along a Z height direction proximate to a workpiece. The method includes performing operations during a learn mode of a first instance of the type of machine vision inspection system to determine a multi-exposure timing difference.

As part of the learn mode operations, first and second regions of interest are defined having different Z heights on a representative workpiece. At least one image stack is collected including respective images of the first and second regions of interest on the representative workpiece focused at respective Z heights. Each respective image of the at least one image stack is exposed using at least one instance of strobed illumination timed to correspond with a respective phase timing of the periodically modulated focus position corresponding to focus at a respective Z height for that respective image of the at least one image stack. First and second multi-exposure timing values for instances of strobed illumination are determined that correspond with first and second phase timings of the periodically modulated focus position that produce a sufficient image focus for the first and second regions of interest, respectively, based at least in part on an analysis of the focus of the first and second regions of interest in the at least one image stack. In various implementations, a sufficient image focus for the first and second regions of interest may be determined according to one or more of a best focus (e.g., as determined from a peak of a focus metric curve and/or a best focused image in an image stack), an approximately best focus, a focus sufficient to support a desired inspection operation based on the multi-exposure image, a focus sufficient for determining a dimensional measurement for inspection with a desired accuracy in the X-Y plane in the multi-exposure image, etc.

Data indicative of the locations of the first and second regions of interest on the representative workpiece and data indicative of a multi-exposure timing difference between the first and second multi-exposure timing values are recorded. The recorded data is usable to define operations that control a multi-exposure image acquisition (e.g., during a run mode) based at least in part on the multi-exposure timing difference when operating a using-instance of the type of machine vision inspection system to acquire a multi-exposure image of the first and second regions of interest on a current workpiece that is similar to the representative workpiece. In various implementations, the using-instance (e.g., utilized during a run mode) and the first instance (e.g., utilized during the learn mode) of the type of machine vision inspection system may be the same machine vision inspection system, or alternatively may be different machine vision inspection systems.

In various implementations, as part of the operating of the using-instance of the type of machine vision inspection system (e.g., during a run mode), the first and second regions of interest are positioned on a current workpiece that is similar to the representative workpiece (e.g., from the learn mode) in a field of view of the imaging system. A first multi-exposure image acquisition timing value is determined that is used for an instance of strobed illumination. The recorded data indicative of the multi-exposure timing difference is used to determine a timing difference between the first multi-exposure image acquisition timing value and a second multi-exposure image acquisition timing value. The imaging system is operated using the periodically modulated focus position in conjunction with using the first and second multi-exposure image acquisition timing values for respective instances of strobed illumination to enhance overall image focus for the first and second regions of interest while acquiring a multi-exposure image of the current workpiece that includes the first and second regions of interest on the current workpiece.

DETAILED DESCRIPTION

Figure 1:
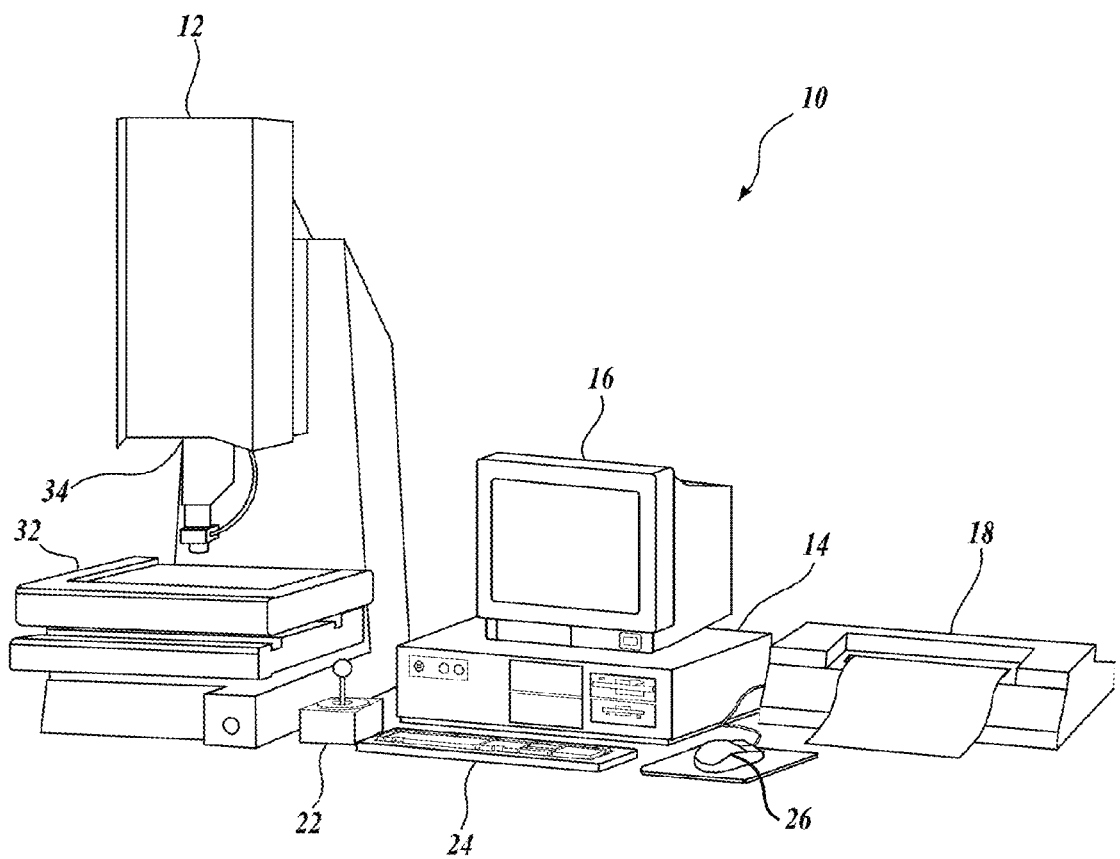
FIG. 1 is a diagram showing various typical components of a general-purpose precision machine vision inspection system.

FIG. 1 is a block diagram of one exemplary machine vision inspection system 10 usable in accordance with principles disclosed herein. The machine vision inspection system 10 includes a vision measuring machine 12 that is operably connected to exchange data and control signals with a controlling computer system 14, and with a monitor or display 16, a printer 18, a joystick 22, a keyboard 24, and a mouse 26. The monitor or display 16 may display a user interface suitable for controlling and/or programming the machine vision inspection system 10. In various implementations, a touchscreen tablet or the like may be substituted for and/or redundantly provide the functions of any or all of the computer system 14, display 16, joystick 22, keyboard 24, and mouse 26.

More generally, the controlling computer system 14 may comprise or consist of any computing system or device, and/or distributed computing environment, and the like, any of which may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications (e.g., 0.5× to 100×) for the images provided by the optical imaging system 34. Similar machine vision inspection systems are described in commonly assigned U.S. Pat. Nos. 7,454,053; 7,324,682; 8,111,905; and 8,111,938, each of which is hereby incorporated herein by reference in its entirety.

Figure 2:
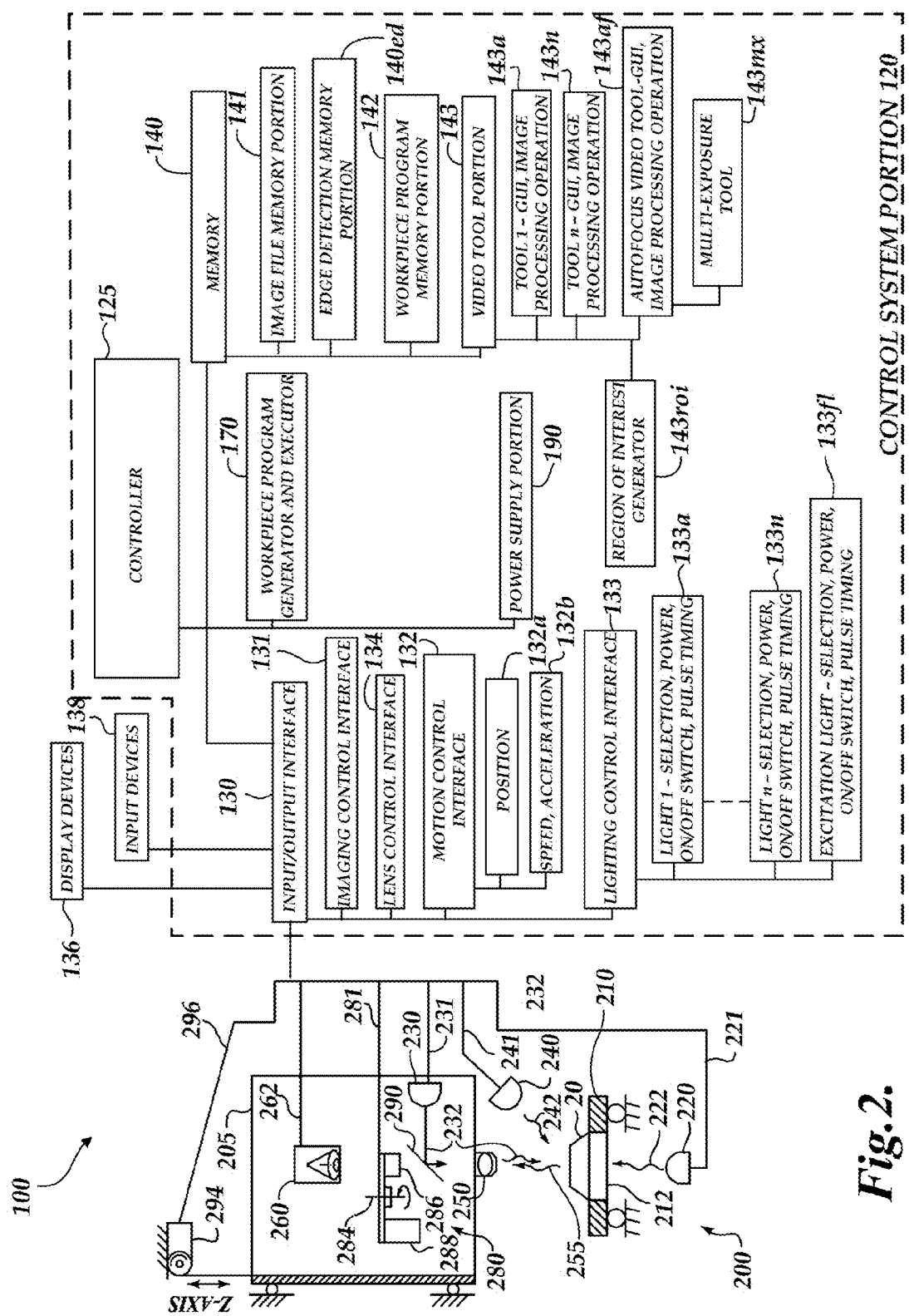
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses (e.g., a set ranging from 0.5× to 100×, etc.)

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20.

One or more of a stage light 220, a coaxial light 230, and a surface light 240 (e.g., a ring light) may emit source light 222, 232, and/or 242, respectively, to illuminate the workpiece or workpieces 20. The coaxial light 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. The control system portion 120 may rotate the turret lens assembly 280 along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and a lens control interface 134. The lens control interface 134 may include a lens controller including a lens focus operating circuit and/or routine, or the like. In various implementations, the lens control interface 134 may further include a magnification change adjustment mode, which may be selected or automatically implemented when a magnification change is made or detected, as described in more detail in copending and commonly assigned U.S. patent application Ser. No. 14/795,409, entitled "Adaptable Operating Frequency of a Variable Focal Length Lens in an Adjustable Magnification Optical System", filed on Jul. 9, 2015, which is hereby incorporated herein by reference in its entirety.

In various implementations, the imaging control interface 131 may include an extended depth of field mode, as described in more detail in copending and commonly assigned U.S. Patent Publication No. 2015/0145980, which is hereby incorporated herein by reference in its entirety. An extended depth of field mode may be selected by a user to provide at least one image (e.g., a composite image) of a workpiece with a depth of field that is greater than what may be provided by the vision components portion 200 when focused at a single focus position. The motion control interface 132 may include a position control element 132a, and a speed/acceleration control element 132b, although such elements may be merged and/or indistinguishable. The lighting control interface 133 may include lighting control elements 133a, 133n, and 133fl that control, for example, the selection, power, on/off switch, and strobe pulse timing, if applicable, for the various corresponding light sources of the machine vision inspection system 100.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. The autofocus video tool 143af includes a multi-exposure tool 143mx that may be utilized for multi-exposure operations, as will be described in more detail below.

In various implementations, the multi-exposure tool 143mx may be utilized during a learn mode to determine and record a multi-exposure timing difference, which can subsequently be utilized for acquiring a multi-exposure image of a workpiece. In various implementations, the multi-exposure tool 143mx may be a special mode of the autofocus video tool 143af that may otherwise operate according to conventional methods for autofocus video tools, or the multi-exposure tool 143mx may be a separate video tool independent from the autofocus video tool 143af. In various implementations, the autofocus video tool 143af, or an additional video tool, may also include a high-speed focus height tool that may be utilized to measure focus heights with high speed, as described in more detail in copending and commonly assigned U.S. Patent Publication No. 2014/0368726, which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool with the underlying operations being included implicitly.

The signal lines or busses 221, 231, and 241 of the stage light 220, coaxial light 230, and surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) may also be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision system components portion 200. The display devices 136 may display user interface features (e.g., as associated with the autofocus video tool 143*af*, the multi-exposure tool 143*mx*, etc.).

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one or more of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a current workpiece (e.g., a run mode workpiece), or workpieces, which is similar to the representative workpiece used when creating the part program.

Figure 3:
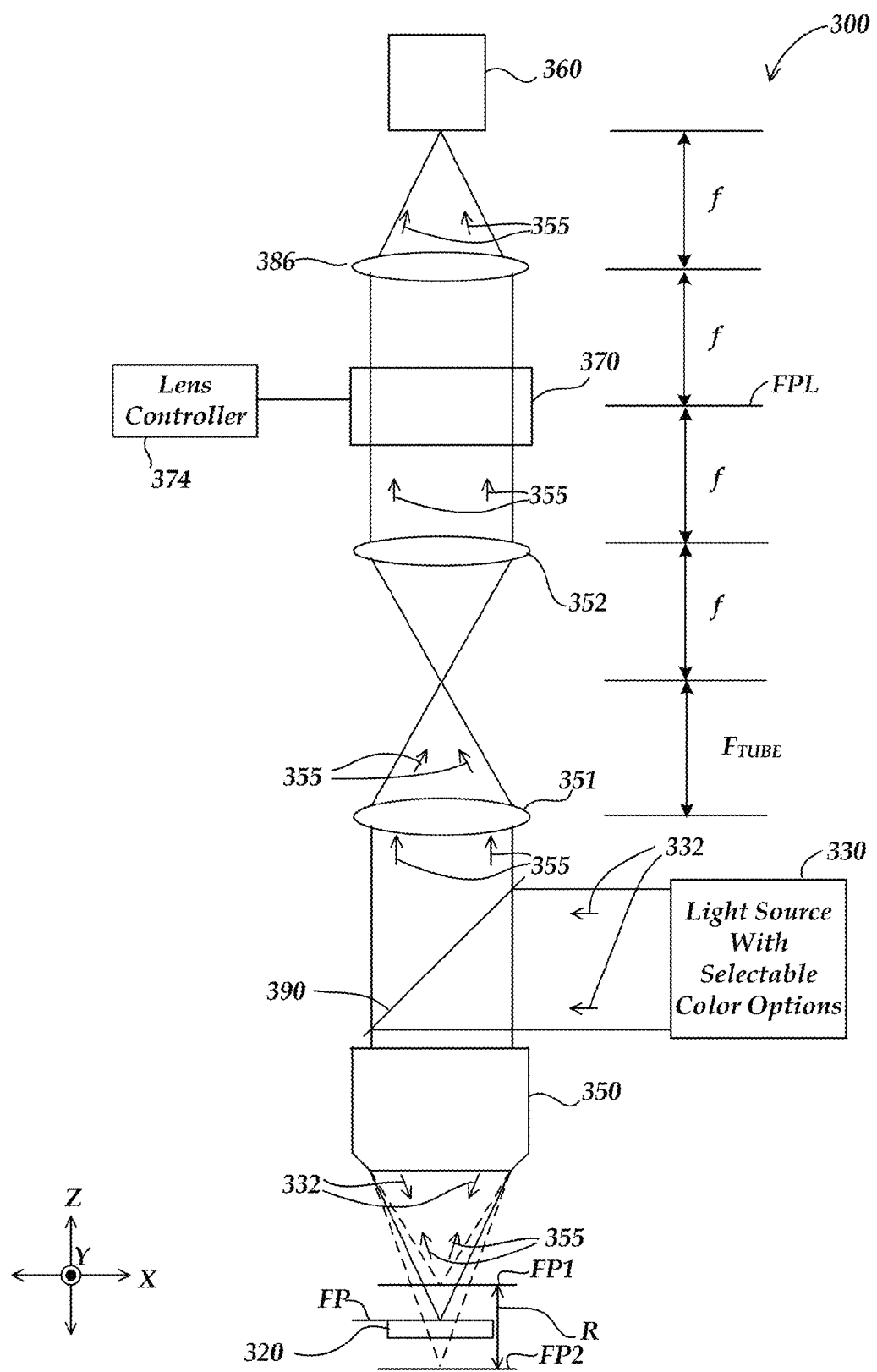
FIG. 3 is a schematic diagram of an imaging system that may be adapted to a machine vision inspection system and operated according to principles disclosed herein.

FIG. 3 is a schematic diagram of an imaging system 300 that may be adapted to a machine vision inspection system and operated according to the principles disclosed herein. The imaging system 300 comprises a light source 330 that is configurable to illuminate a workpiece 320 (e.g., with strobed or continuous-wave illumination) in a field of view of the imaging system 300, an objective lens 350, a tube lens 351, a relay lens 352, a variable focal length lens (VFL) 370, a relay lens 386, and a camera system 360.

In operation, the light source 330 is configurable to emit source light 332 along a path including a partial mirror 390 and through the objective lens 350 to a surface of a workpiece 320, wherein the objective lens 350 receives workpiece light 355 that is focused at a focus position FP proximate to the workpiece 320, and outputs the workpiece light 355 to the tube lens 351. In various implementations, the objective lens 350 may be an interchangeable objective lens and the tube lens 351 may be included as part of a turret lens assembly (e.g., similar to the interchangeable objective lens 250 and the turret lens assembly 280 of FIG. 2). In various implementations, the objective lens 350, tube lens 351, or any of the other lenses referenced herein may be formed from or operate in conjunction with individual lenses, compound lenses, etc. The tube lens 351 receives the workpiece light 355 and outputs it to the relay lens 352.

The relay lens 352 receives the workpiece light 355 and outputs it to the VFL lens 370. The VFL lens 370 receives the workpiece light 355 and outputs it to the relay lens 386. The relay lens 386 receives the workpiece light 355 and outputs it to the camera system 360. In various implementations, the camera system 360 may capture an image of the workpiece 320 during an image exposure period, and may provide the image to a control system portion (e.g., similar to the operation of the camera system 260 for providing an image to the control system portion 120 in FIG. 2).

The VFL lens 370 is electronically controllable to vary the focus position FP of the imaging system during one or more image exposures. The focus position FP may be moved within a range R bound by a focus position FP1 and a focus position FP2. It will be appreciated that in various implementations, the range R may be selected by a user or may result from design parameters or may otherwise be automatically determined. In general with respect to the example of FIG. 3, it will be appreciated that certain of the illustrated dimensions may not be to scale. For example, the VFL lens 370 may have different proportional dimensions than those illustrated (e.g., may be less wide and up to 50 mm long or longer for certain applications in order to provide a desired amount of lensing power, etc.)

In various implementations, a machine vision inspection system may comprise a control system (e.g., the control system 120 of FIG. 2) that is configurable to operate in conjunction with a lens controller 374 or to otherwise control the VFL lens 370 to periodically modulate a focus position of the imaging system 300. In some implementations, the VFL lens 370 may very rapidly adjust or modulate the focus position (e.g., periodically, at a rate of at least 300 Hz, or 3 kHz, or 70 kHz, or much higher). In one example implementation, the range R may be approximately 10 mm (e.g., for a 1× objective lens 350). In various implementations, the VFL lens 370 is advantageously chosen such that it does not require any macroscopic mechanical adjustments in the imaging system and/or adjustment of the distance between the objective lens 350 and the workpiece 320 in order to change the focus position FP. In such a case, in accordance with the principles disclosed herein, a multi-exposure image may be acquired at a high rate, or as described in the previously incorporated '980 publication, an extended depth of field image may be acquired, and furthermore there are no macroscopic adjustment elements or associated positioning non-repeatability to degrade accuracy when the same imaging system is used for acquiring fixed focus inspection images. As described in the previously incorporated '726 publication, the changes in the focus position FP may also be utilized to rapidly acquire an image stack including a plurality of images at a plurality of positions along a Z height direction proximate to the workpiece 320.

In various implementations, the VFL lens 370 may be a tunable acoustic gradient index of refraction ("TAG") lens. A tunable acoustic gradient index of refraction lens is a high-speed VFL lens that uses sound waves in a fluid medium to modulate a focus position and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 KHz.

In various implementations, as described in more detail in the previously incorporated '726 publication, the camera system 360 may comprise a sensor with a global shutter, i.e., a sensor, that exposes each pixel simultaneously. Such an embodiment is advantageous in that it provides the capability to measure image stacks without motion of a workpiece or any part of the imaging system 300. In various alternative implementations, the camera system 360 may comprise a sensor with an electronic rolling shutter (ERS) system. For example, the camera system may comprise a black and white CMOS sensor using SXGA resolution coupled with an electronic rolling shutter (ERS) system (e.g., model MT9M001 from Aptina Imaging of San Jose, Calif.).

The VFL lens 370 may be driven by the lens controller 374, which may generate a signal to operate the VFL lens 370. In one embodiment, the lens controller 374 may be a commercial controllable signal generator. In some implementations, the lens controller 374 may be configured or controlled by a user and/or an operating program through the imaging control interface 131 and/or the lens control interface 134 and/or the multi-exposure tool 143*mx*, as outlined previously with respect to FIG. 2. In some implementations, the VFL lens 370 may be operated using a periodic signal such that the focus position FP is modulated sinusoidally over time, at a high frequency. For example, in some exemplary implementations, a tunable acoustic gradient index of refraction lens may be configured for focal scanning rates as high as 400 kHz, although it should be appreciated that slower focus position adjustments and/or modulation frequencies may be desirable in various implementations and/or applications. For example, in various implementations a periodic modulation of 300 Hz, or 3 kHz, or 70 kHz, or 250 kHz, or the like may be used. In implementations where slower focus position adjustments are used, the VFL lens 370 may comprise a controllable fluid lens, or the like.

In the example of FIG. 3, the relay lenses 352 and 386 and the VFL lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance $F_{TUBE}$ of the tube lens 351 is illustrated as being approximately equidistant to a midpoint between the lenses 351 and 352, as is a focal distance f of the relay lens 352. In alternative implementations, the focal distance $F_{TUBE}$ for the tube lens 351 may be made to be different than the focal distance f of the relay lens 352 (which corresponds to one of the 4 f's of the 4f optical configuration). In various implementations where the tube lens 351 may be included as part of a turret lens assembly, it may be desirable for other tube lenses of the turret lens assembly when rotated into the operational position to have a focal point at the same location (i.e., so as to meet the focal point of the relay lens 352).

As described in more detail in the previously incorporated '409 application, the ratio of the focal distance $F_{TUBE}$ to the focal distance f can be utilized to alter the diameter of the collimated beam of workpiece light 355 out of the relay lens 352 relative to the collimated beam of the workpiece light 355 that is input to the tube lens 351. It will be appreciated with respect to the collimated beams of workpiece light 355 that are respectively input to the tube lens 351 and output from the relay lens 352, that in various implementations such collimated beams may be extended into longer path lengths and/or beam splitters may be utilized with respect to such collimated beams for providing additional optical paths (e.g., as directed to different camera systems, etc.).

In various implementations, the illustrated 4f optical configuration permits placing the VFL lens 370 (e.g., which may be a low numerical aperture (NA) device, such as a tunable acoustic gradient index of refraction lens), at the fourier plane FPL of the objective lens 350. This configuration may maintain the telecentricity at the workpiece 320 and may minimize scale change and image distortion (e.g., including providing constant magnification for each Z height of the workpiece 320 and/or focus position FP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL lens, so as to minimize image aberrations, etc.

It will be appreciated that in various implementations, certain types of dimensional measurements may require near-diffraction or diffraction-limited imaging. The configuration illustrated in FIG. 3 reduces aberrations by restricting the off-axis extent of the pupil of the objective lens 350 that is imaged into the VFL lens 370. In this configuration, the radial extent may be maintained to be less than the radial extent of the 1st Bessel ring in the refractive index profile of the standing wave of the VFL lens 370 (e.g., a tunable acoustic gradient index of refraction lens) at its lowest resonant frequency $f_{R,MIN}$, as described in more detail in the previously incorporated '409 application. In this manner, light from the microscope configuration (i.e., including the objective lens 350 and the tube lens 351) does not exceed the largest clear aperture $CA_{VFL,MAX}$ of the VFL lens 370. In an implementation where the light did exceed the largest clear aperture, the light could interact with the region of the standing wave of the VFL lens 370 that may have an undesirable refractive index which could increase aberrations and reduce dimensional measurement precision. Some example operations of the imaging system 300 including the light source 330 and camera system 360 will be described in more detail below with respect to FIGS. 4 and 5.

Figure 4:
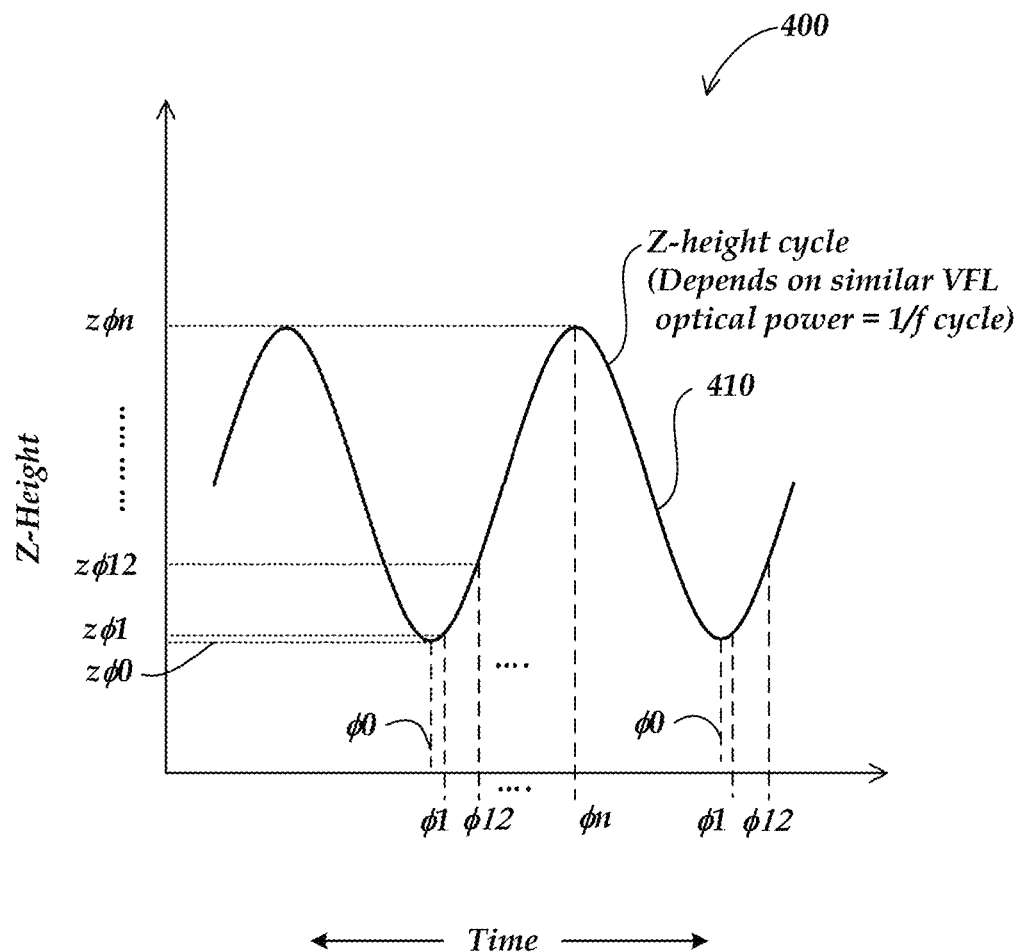
FIG. 4 is a chart of a timing diagram showing a periodically modulated Z height of the focus position of the imaging system of FIG. 3 as controlled by periodically modulating the focal length of a variable focal length lens in the imaging system, and also qualitatively showing how strobed illumination can be timed to correspond with a respective phase timing of the periodically modulated focus position to expose an image focused at a respective Z height.

FIG. 4 is a chart of a timing diagram 400 showing a periodically modulated Z height of the focus position of the imaging system of FIG. 3 as controlled by periodically modulating the focal length of a variable focal length lens in the imaging system (e.g., the VFL lens 370), as outlined above. The periodically modulated Z height is represented by a sinusoidal curve 410, also labeled "Z-height cycle". The relationship of the Z-height to the phase timing may be established by calibration according to known principles (e.g., by repeatedly stepping a surface to a known Z-height, and then manually or computationally determining the phase timing that best focuses an image at the known Z-height, and storing that relationship in a lookup table or the like).

The diagram 400 also qualitatively shows how strobed illumination can be timed to correspond with a respective phase timing (e.g., $\phi 0$, $\phi 1$, $\phi 12$, $\phi n$, etc.) of the periodically modulated focus position to expose an image focused at a respective Z height (e.g., $z\phi 0$, $z\phi 1$, $z\phi 12$, $z\phi n$, etc.). That is, in the illustrated example, while a digital camera is acquiring an image during an integration period, if a strobe pulse is short relative to the period of the focus modulation and is provided at the phase timing $\phi 0$, then the focus position will be at the height $z\phi 0$, and any workpiece surface that is located at the height $z\phi 0$ will be in focus in the resulting image. Of course the same is true for the other exemplary phase timings and Z heights shown in the diagram 400.

It will be understood that the phase timings shown in the diagram 400 are exemplary only and not limiting. More generally, any phase timing selected by a user or automatically selected by a control system will have an associated focus position Z-height within the range of focus positions $z\phi 0$-$z\phi n$, which represent the minimum and maximum Z-heights of the periodically modulated Z height of the focus position. It will also be understood that if one strobe pulse at a particular phase timing is not sufficient to provide a well exposed image, the strobe pulse may be repeated at that particular phase timing for any desired number of periods within the image integration period (as schematically illustrated by the repeated instances of any of the exemplary phase timings $\phi 0$, $\phi 1$, $\phi 12$ in the diagram 400). One, or thousands, of such pulses may be integrated in an integration period, in some embodiments or implementations. The effect will be to increase the image exposure corresponding to that particular phase timing and/or Z-height in the resulting image. (As one specific example implementation, for a variable focal length lens that modulates at a frequency of 72 kHz and an imaging array in a camera operating at 30 frames per second, a single camera frame acquisition time corresponds to 2,400 cycles of the variable focal length lens and the resulting focus position Z-height.) It should be appreciated that the exemplary phase timings $\phi 1$ and $\phi 12$ are shown on a rising slope of the Z-height cycle. In some embodiments, pulses may also be integrated in an integration period which corresponds to the same Z-heights during a falling slope of the Z-height cycle.

Figure 5:
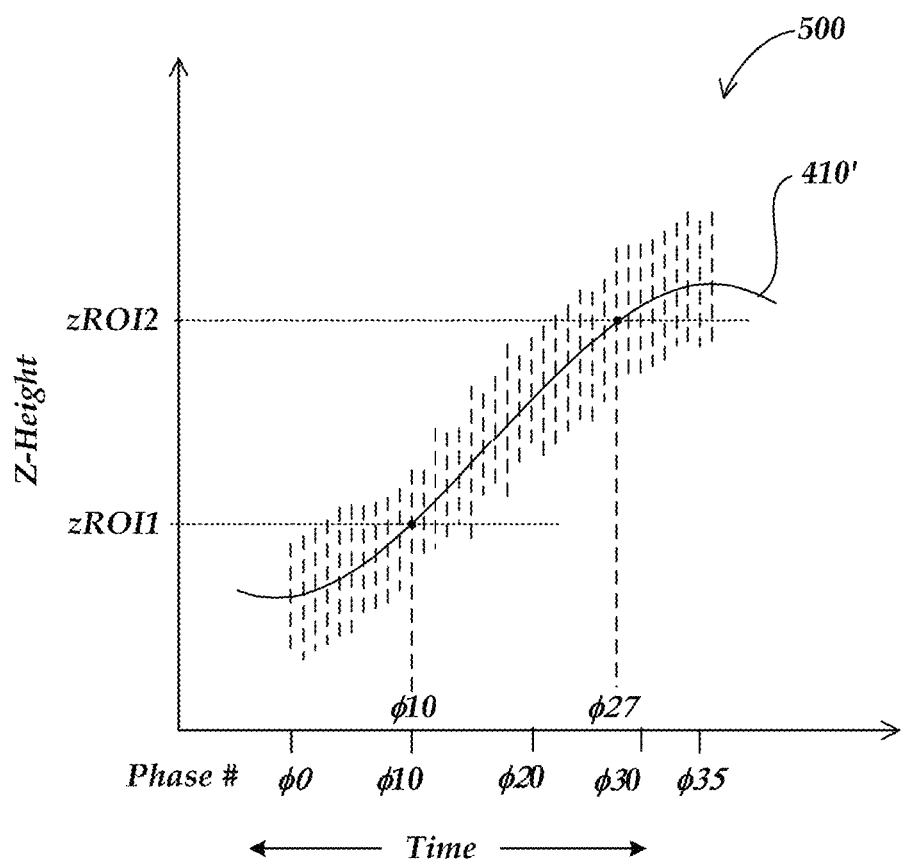
FIG. 5 is a chart showing an expanded portion of the periodically modulated Z height of the focus position shown in FIG. 4, phase timings corresponding to those usable to collect an image stack, and also qualitatively showing how first and second instances of strobed illumination that correspond with first and second phase timings of the periodically modulated focus position can be combined to produce a multiple exposure image that provides sufficient image focus in first and second regions of interest that are located at different Z heights.

FIG. 5 is a chart 500 showing a horizontally expanded portion of the periodically modulated Z height 410' of the focus position shown in FIG. 4, and phase timings corresponding to those usable to collect an image stack (represented by the phase timing positions of the vertical dashed lines in the chart 500), and also qualitatively showing how first and second particular instances of strobed illumination that correspond with first and second phase timings (e.g., the exemplary phase timings $\phi 10$ and $\phi 27$) of the periodically modulated focus position can be combined to produce a multiple exposure image that provides sufficient image focus in first and second regions of interest that are located at different Z heights (e.g., the z-height zROI1 for a region of interest ROI1, and the z-height zROI2 for a region of interest ROI2).

Regarding the phase timings corresponding to those usable to collect an image stack (represented by the phase timing positions of the vertical dashed lines in the chart 500), in accordance with principles disclosed herein, in one implementation an image stack (or multiple image stacks) may be acquired during a learn mode with respect to first and second regions of interest on a representative workpiece. For example, an image stack may be acquired by exposing a first image using one or more strobe illumination pulses (over one or more periods) coinciding with the phase timing $\phi 0$. A second image in the image stack may be similarly acquired using the phase timing $\phi 1$, and so on up to $\phi 35$ in the illustrated example. It will be understood that an image stack images a field of view using various focus positions, and generally can include any desired number of images at desired Z-heights, acquired using corresponding phase timings.

Regarding FIG. 5 showing how first and second particular instances of strobed illumination that correspond with first and second phase timings (e.g., the exemplary phase timings $\phi 10$ and $\phi 27$) of the periodically modulated focus position can be combined to produce a multiple exposure image, explanation follows: As illustrated in FIG. 5, first and second regions of interest ROI1 and ROI2 in the field of view on a representative workpiece are indicated as having a sufficient image focus in respective images of an image stack. ROI1 is indicated as being best or sufficiently focused at a Z-height zROI1 which corresponds to a phase timing of $\phi 10$, and ROI2 is indicated as being best or sufficiently focused at a Z-height zROI2 which corresponds to a phase timing of $\phi 27$. For example, during a learn mode of operation, this may be determined by analyzing the contrast (e.g., according to known methods) in the first region of interest ROI1, and the second region on interest ROI2, in each image of an image stack acquired during the learn mode of operation. Then the particular images and/or interpolated Z-heights indicated as providing the best or sufficient contrast and focus for ROI1, and ROI2, respectively, may be determined (e.g., as described in greater detail below). In various embodiments, the Z-heights and/or the difference between the Z-heights and/or the first and second phase timings corresponding to the first and second Z-heights (or other data indicative of a corresponding multi-exposure timing difference) may be recorded in a part program corresponding to ROI1 and ROI2, respectively. Assuming that a workpiece similar to the representative workpiece is at a similar Z-height relative to the imaging system, the first phase timing may be used as a first multi-exposure timing value to expose ROI1 in focus in a multiple exposure image, and the second phase timing may be used as a second multi-exposure timing value to expose ROI2 in focus in the same multiple exposure image.

In various implementations, a determination of an image which has the best or sufficient image focus for a region of interest may be made according to various techniques. In one specific example implementation, a technique including an analysis of a focus curve may be utilized. A focus curve may be formed based on focus curve data points, which may be established according to known methods (e.g., as described in incorporated references). Briefly, in one exemplary method, for each captured image in the image stack, a focus metric value is calculated based on the respective region of interest in that image, and that focus metric value becomes a data point on the focus curve (e.g., related to the corresponding phase timing and Z height at which the image was captured). This results in focus curve data, which may be referred to simply as a "focus curve" or "autofocus curve." Exemplary techniques for the determination and analysis of image stacks and focus curves are taught in U.S. Pat. No. 6,542,180, which is commonly assigned and hereby incorporated herein by reference in its entirety. In one implementation, an image which has a sufficient image focus for a region of interest may be determined according to an image which is at or near the peak of the focus curve (e.g., an image which has a highest or near-highest focus metric value for the respective region of interest relative to the other images in the image stack).

In various implementations, such techniques may be utilized as part of an automatic focusing operation comprising image analysis. For example, in accordance with principles disclosed herein, such techniques may be utilized during a learn mode to automatically determine first and second multi-exposure timing values, and data indicative of a corresponding multi-exposure timing difference may be recorded. Subsequently (e.g., during a run mode), such techniques may be utilized to automatically determine a first multi-exposure image acquisition timing value that produces a sufficient image focus for the first region of interest on a current workpiece. A second multi-exposure image acquisition timing value may then be determined based on the recorded data that is indicative of the corresponding multi-exposure timing difference, without requiring the use of an automatic focusing operation comprising image analysis with respect to the second region of interest. In an implementation utilizing focus curves for image analysis, this would mean that a focus curve would not need to be generated and analyzed for the second region of interest on the current workpiece, which allows the overall process (e.g., during a run mode) to be performed more quickly and efficiently.

Figure 6:
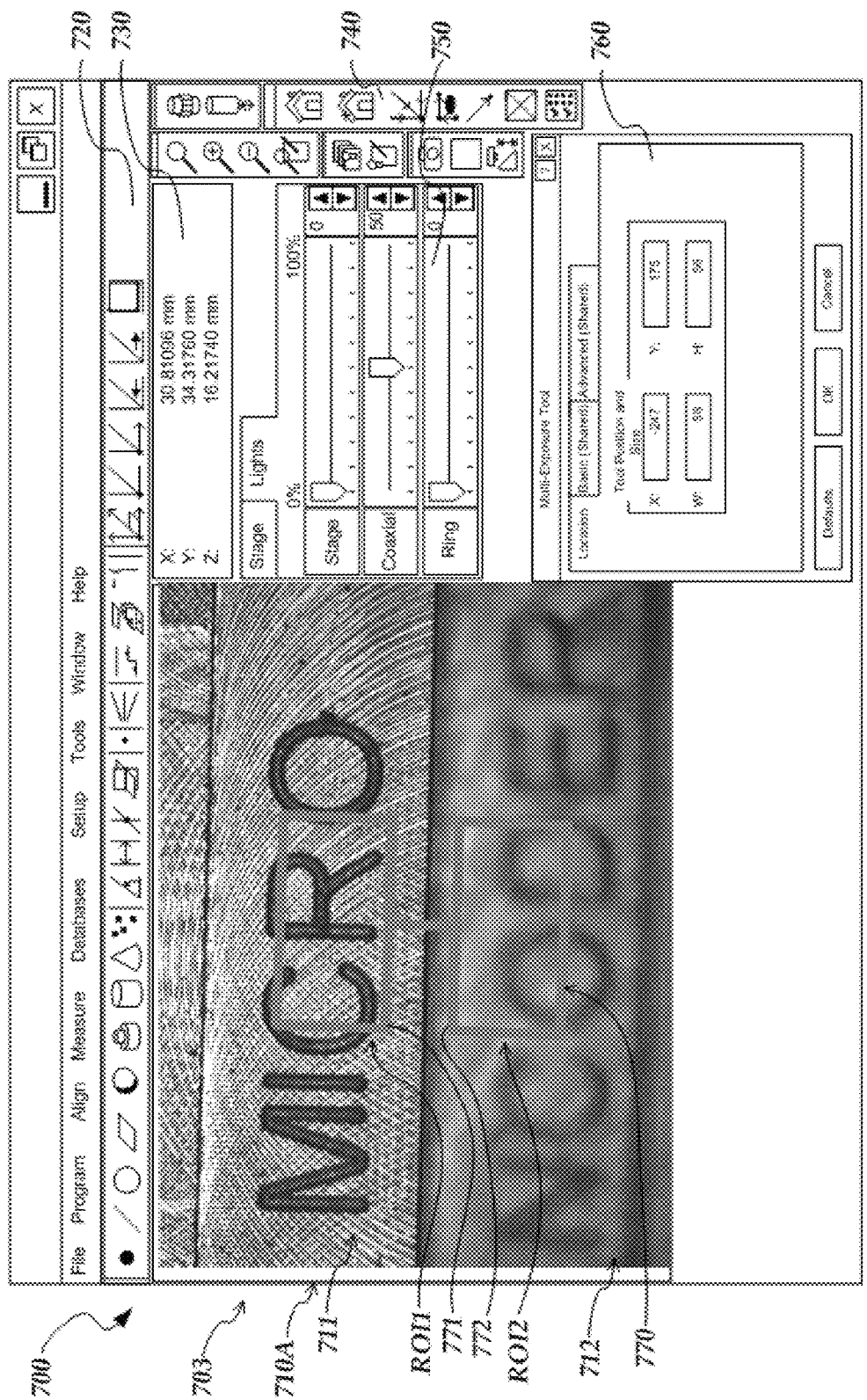
FIG. 6 is a diagram illustrating a machine vision inspection system user interface display including a multi-exposure tool with a first region of interest in focus on a workpiece.
Figure 7:
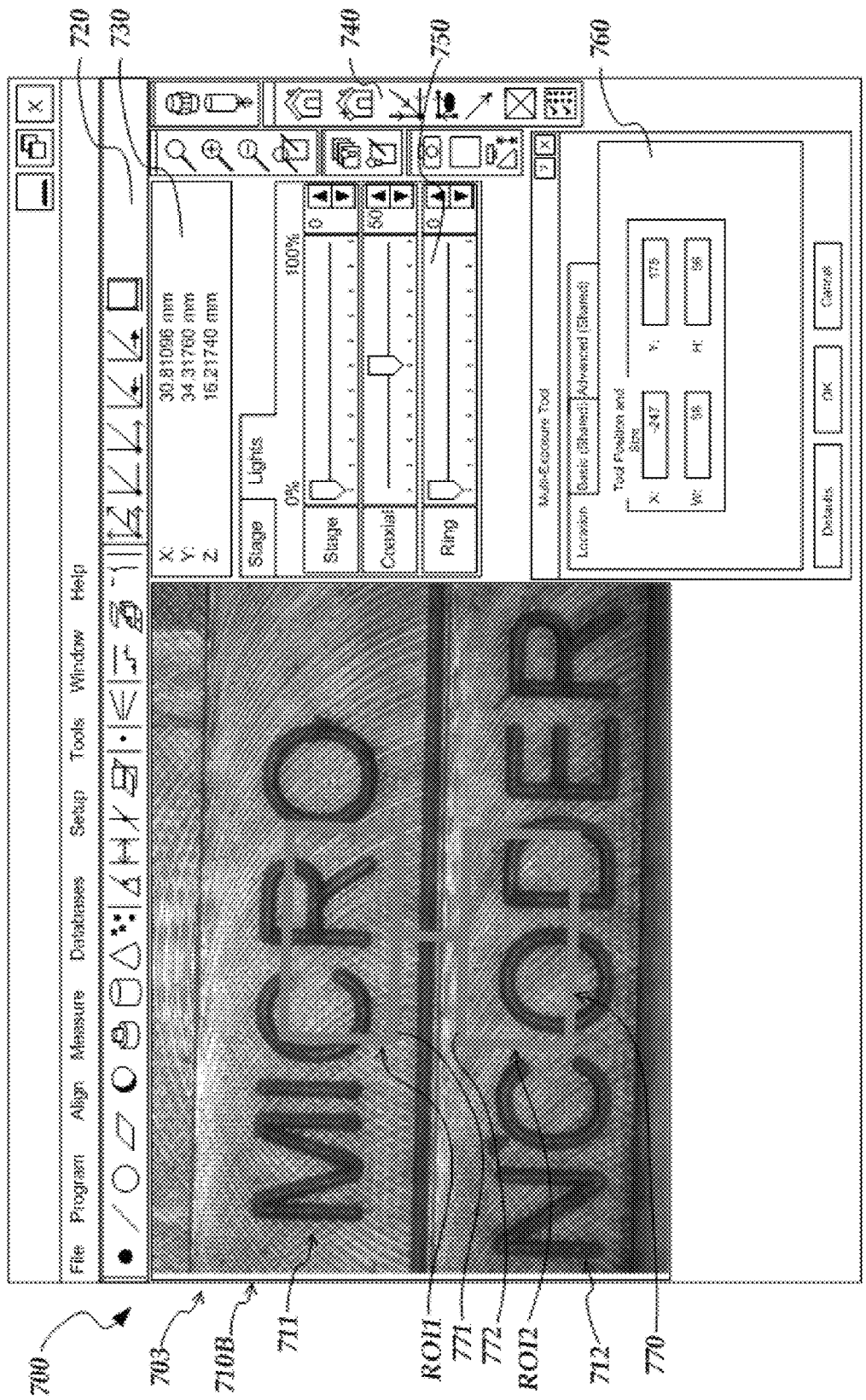
FIG. 7 is a diagram illustrating the machine vision inspection system user interface display of FIG. 6 wherein the multi-exposure tool has been utilized to acquire a multi-exposure image of the workpiece.
Figure 8:
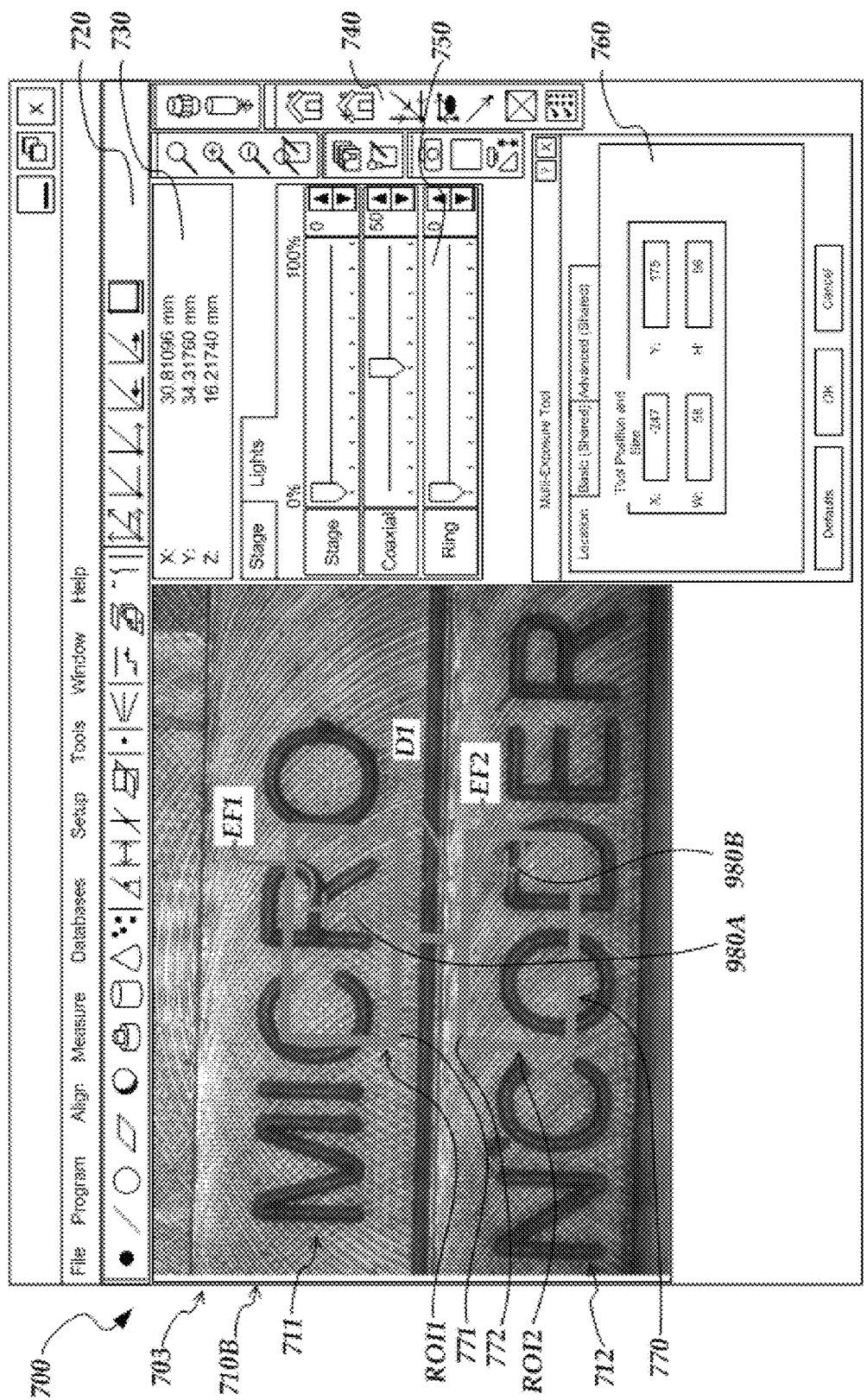
FIG. 8 is a diagram illustrating the machine vision inspection system user interface display of FIG. 7 including additional video tools utilized for performing workpiece feature inspection operations on the multi-exposure image of the workpiece.

FIGS. 6-8 are diagrams illustrating a machine vision inspection system user interface display 700 including a graphical user interface (GUI) for a multi-exposure tool 770. In the exemplary state shown in FIG. 6, the user interface display 700 includes a field of view window 703 that displays a workpiece image 710A that includes a first surface 711 (e.g., including the letters "MICRO") and a second surface 712 (e.g., including the letters "NCODER"). The first and second surfaces 711 and 712 are at different Z heights. The user interface display 700 also includes various measurement and/or operation selection bars such as selection bars 720 and 740, a real-time X-Y-Z (position) coordinate window 730, and a light control window 750.

The field of view window 703 includes the multi-exposure tool 770 superimposed upon the workpiece image 710A. The multi-exposure tool 770 includes a first portion 771 defining a first region of interest ROI1 (e.g., on the first surface 711 corresponding to a first Z height), and a second portion 772 defining a second region of interest ROI2 (e.g., on the second surface 712 corresponding to a second Z height). In various implementations, if the user selects the multi-exposure tool 770 (or a portion thereof) for editing, the user interface may automatically display a tool parameter dialog box 760, which allows certain aspects (e.g., such as tool position and size) to be adjusted by a user. Alternatively or in addition, a user may be able to graphically adjust various aspects (e.g., by clicking and dragging the tool as a whole, or certain portions thereof) for changing the position, size, orientation, etc. of the multi-exposure tool 770.

In the exemplary state shown in FIG. 6, the multi-exposure tool 770 has been utilized to acquire a workpiece image 710A that has a sufficient image focus for the first region of interest ROI1. For example, during the learn mode, or during subsequent operations (e.g., during a run mode), an automatic focusing operation comprising image analysis (e.g., of images in an acquired image stack) may be utilized to determine a first multi-exposure timing value that produces a sufficient image focus for the first region of interest ROI1. It will be appreciated that when an image from an image stack is selected with a sufficient image focus for the first region of interest ROI1, the second region of interest ROI2 may be relatively unfocused in the same image, as illustrated in the workpiece image 710A of FIG. 6. As noted above, this may be due at least in part to the Z height difference between the surfaces 711 and 712 in the first and second regions of interest ROI1 and ROI2, respectively.

As described above, during the learn mode an automatic focusing operation comprising image analysis may also be used to determine a second multi-exposure timing value that produces a sufficient image focus for the second region of interest ROI2 (not shown). Data may then be recorded indicative of the locations of the first and second regions of interest on the representative workpiece and data may be recorded indicative of a multi-exposure timing difference between the first and second multi-exposure timing values. In various implementations, the recorded data may be usable to define operations that control a multi-exposure image acquisition based at least in part on the multi-exposure timing difference when acquiring a multi-exposure image of first and second regions of interest on a current workpiece that is similar to the representative workpiece.

FIG. 7 is a diagram illustrating the machine vision inspection system user interface display 700 of FIG. 6 wherein the multi-exposure tool 770 has been utilized to acquire a multi-exposure image of the workpiece. For example (e.g., during a run mode), once a first multi-exposure image acquisition timing value is determined (e.g., utilizing an automatic focusing operation including image analysis), the recorded data indicative of the multi-exposure timing difference may be used to determine a timing difference between the first multi-exposure image acquisition timing value and a second multi-exposure image acquisition timing value. The imaging system may then be operated using the periodically modulated focus position in conjunction with using the first and second multi-exposure image acquisition timing values for respective instances of strobed illumination to enhance overall image focus for the first and second regions of interest while acquiring a multi-exposure image of the current workpiece. As another example, during the learn mode, the imaging system may be operated using the periodically modulated focus position in conjunction with using the first and second multi-exposure timing values for respective instances of strobed illumination while acquiring a multi-exposure image of the representative workpiece.

In either case, in the exemplary state shown in FIG. 7, an acquired workpiece image 710B (which is a multi-exposure image as described above) illustrates that the overall image focus has been enhanced for the first and second regions of interest ROI1 and ROI2. More specifically, in the workpiece image 710B of FIG. 7 (e.g., as compared to the workpiece image 710A of FIG. 6) the image focus of the second region of interest ROI2 has been significantly improved (e.g., as illustrated by the reduction in blurring and readability of the letters "OD"), while the image focus for the first region of interest ROI1 has only been slightly degraded by the second instance of strobed illumination (e.g., due to the in-focus surface being somewhat contaminated by defocused light from the other focus plane). As a result, the overall image focus has been enhanced for the first and second regions of interest ROI1 and ROI2.

FIG. 8 is a diagram 800 illustrating the machine vision inspection system user interface display of FIG. 8 including additional video tools utilized for performing workpiece feature inspection operations (e.g., locating workpiece features) on the multi-exposure image 710B of the workpiece. In the exemplary state shown in FIG. 8, point tools 980A and 980B are utilized for locating first and second edge features EF1 and EF2 in the first and second regions of interest ROI1 and ROI2, respectively. In other implementations, other video tools (e.g., box tools, circle tools, arc tools, etc.) may be utilized for locating other workpiece features. The operations of such video tools for locating edge features and performing other workpiece feature inspection operations are described in more detail in the previously incorporated references, as well as in U.S. Pat. No. 7,627,162, which is hereby incorporated herein by reference in its entirety.

Once various features are located, additional inspection operations may be performed. For example, in the implementation of FIG. 8, once the edge features EF1 and EF2 are located, a distance D1 may be determined between the edge features EF1 and EF2. It will be appreciated that inspection operations such as the determination of the distance D1 may have a higher probability of accuracy when performed on the single multi-exposure image 710B as compared to prior systems where multiple images may have been required (e.g., using different images for each of the regions of interest at the different Z heights, wherein any misalignment between the images or features coming from mechanical Z stage inaccuracies could result in measurement errors, etc.) In various implementations, the image quality in each of the first and second regions of interest ROI1 and ROI2 may be analyzed to confirm that the image focus is better than a pre-determined threshold that is related to a desired level of accuracy for the locating of the first and second edge features EF1 and EF2. The predetermined threshold may be utilized to determine if there is a sufficient image focus for the first and second regions of interest ROI1 and ROI2.

It will be appreciated that the multi-exposure image 710B may be sufficiently focused with respect to the first and second regions of interest ROI1 and ROI2 to allow inspection operations (e.g., such as those described above) to be accurately performed. In prior systems, such inspection operations for workpiece features at different Z heights required utilization of multiple images and/or post-processing of images in order to accurately determine and measure such workpiece features. By allowing for the rapid acquisition of a multi-exposure image with workpiece features at different Z heights without requiring utilization of image data from additional images, the speed and efficiency of the system for such operations is improved.

In various alternative implementations, certain selective post-processing (e.g., deconvolution utilizing image data from additional images) may be performed on the multi-exposure image. For example, techniques similar to the integrated point spread function deconvolution described in the previously incorporated '980 publication may be utilized. In such implementations, the point spread function used for post-processing may be integrated for only specified Z levels (e.g., corresponding to the first and second regions of interest ROI1 and ROI2) instead of the entire Z scan range.

Figure 9:
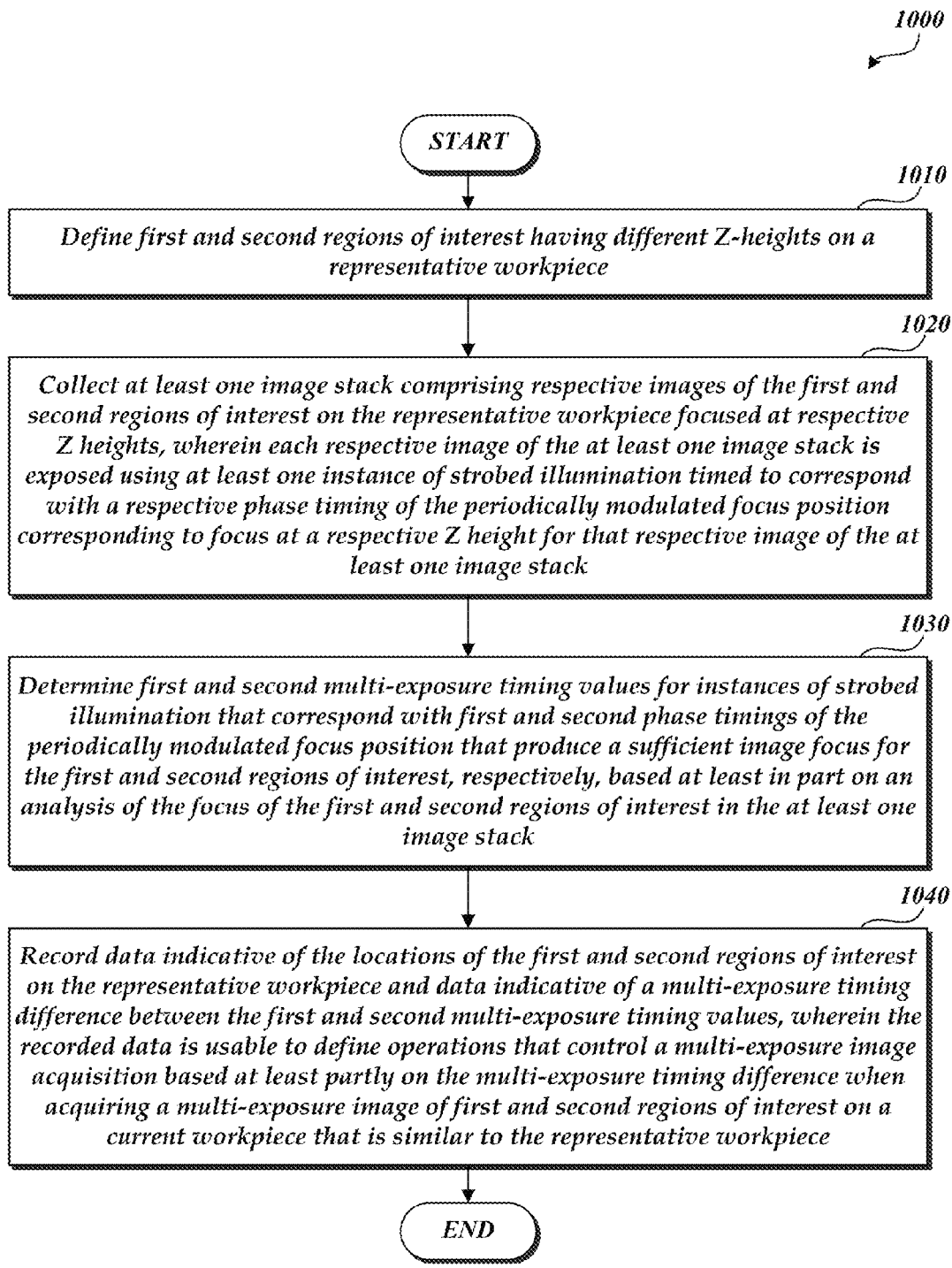
FIG. 9 is a flow diagram illustrating one exemplary implementation of a routine for determining and recording a multi-exposure timing difference.

FIG. 9 is a flow diagram illustrating one exemplary implementation of a routine 1000 for determining and recording a multi-exposure timing difference (e.g., during a learn mode). At block 1010, first and second regions of interest having different Z heights on a representative workpiece are defined. At block 1020, at least one image stack is collected comprising respective images of the first and second regions of interest on the representative workpiece focused at respective Z heights. In various implementations, each respective image of the at least one image stack is exposed using at least one instance of strobed illumination timed to correspond with a respective phase timing of the periodically modulated focus position corresponding to focus at a respective Z height for that respective image of the at least one image stack. In various implementations, the at least one instance of strobed illumination timed to correspond with a respective phase timing of the periodically modulated focus position corresponding to focus at a respective Z height for a respective image of the at least one image stack may comprise a plurality of repeated instances illumination at that respective phase timing over multiple periods of the focus cycle within an image integration period.

At block 1030, first and second multi-exposure timing values for instances of strobed illumination are determined that correspond with first and second phase timings of the periodically modulated focus position that produce a sufficient image focus for the first and second regions of interest, respectively, based at least in part on an analysis of the focus of the first and second regions of interest in the at least one image stack. At block 1040, data indicative of the locations of the first and second regions of interest on the representative workpiece and data indicative of a multi-exposure timing difference between the first and second multi-exposure timing values is recorded. In various implementations, the recorded data is usable to define operations that control a multi-exposure image acquisition based at least in part on the multi-exposure timing difference when acquiring a multi-exposure image of first and second regions of interest on a current workpiece that is similar to the representative workpiece.

In various implementations, the recorded data may be recorded in association with a part program for inspecting instances of the representative workpiece, and the using of the recorded data may include executing the part program on the using-instance of the machine vision inspection system. In various implementations, the using-instance (e.g., utilized during the run mode) and the first instance (e.g., utilized during the learn mode) of the type of machine vision inspection system may be the same machine vision inspection system, or alternatively may be different machine vision inspection systems.

In various implementations, during the learn mode a third (or more) multi-exposure timing value for an instance of strobed illumination may be determined based at least in part on an analysis of a focus of a third region of interest in the at least one image stack. The recording of the data may correspondingly include recording data indicative of the location of the third region of interest on the representative workpiece and data indicative of an additional multi-exposure timing difference between the third multi-exposure timing value and at least one of the first or second multi-exposure timing values. The recorded data may thus be usable to define operations that control a multi-exposure image acquisition based at least partly on the multi-exposure timing difference and the additional multi-exposure timing difference when operating a using-instance of the type of machine vision inspection system to acquire a multi-exposure image of the first, second and third (or more) regions of interest on a current workpiece that is similar to the representative workpiece.

Figure 10:
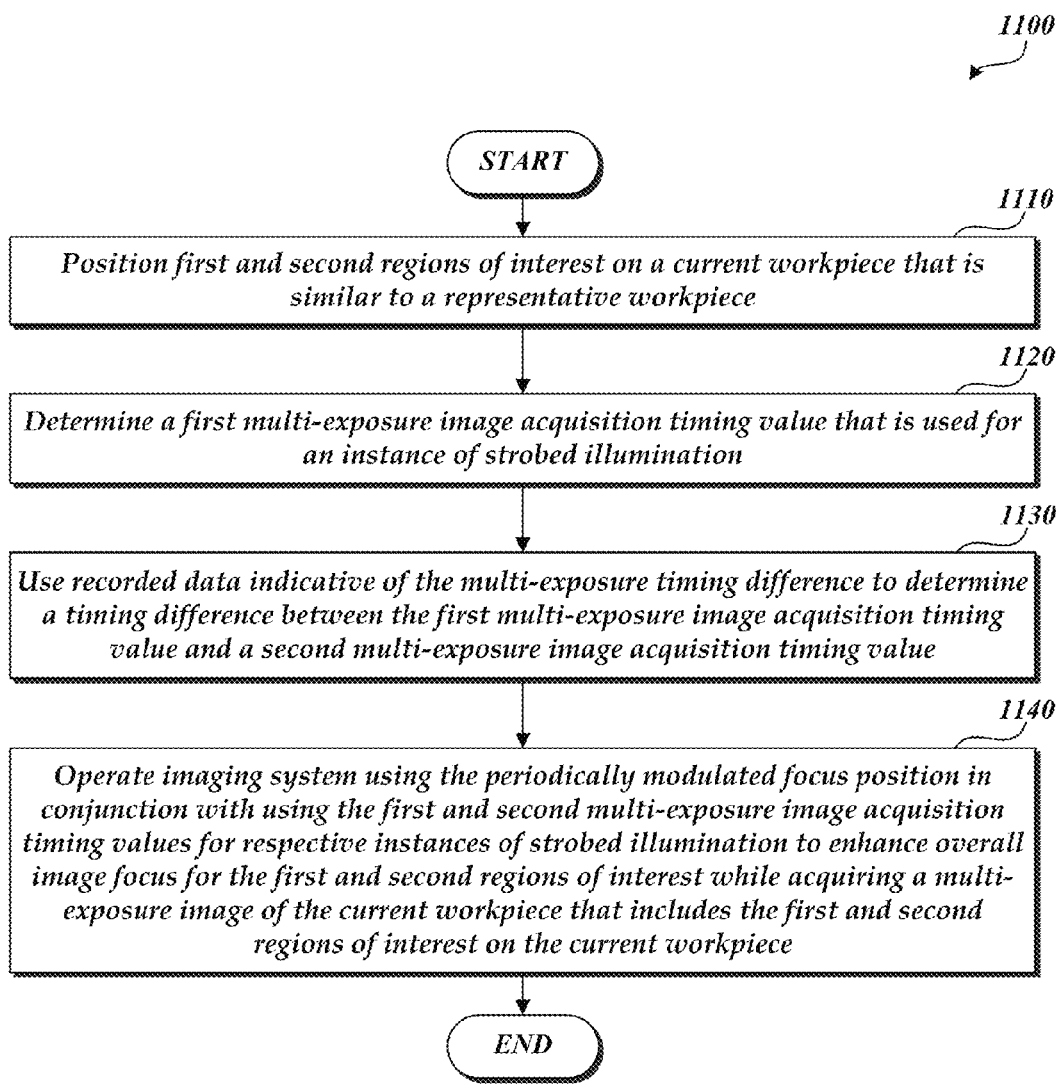
FIG. 10 is a flow diagram illustrating one exemplary implementation of a routine for utilizing a recorded multi-exposure timing difference for acquiring a multi-exposure image of a workpiece.

FIG. 10 is a flow diagram illustrating one exemplary implementation of a routine 1100 for utilizing a recorded multi-exposure timing difference for acquiring a multi-exposure image of a workpiece (e.g., during a run mode). At block 1110, first and second regions of interest are positioned on a current workpiece that is similar to the representative workpiece. At block 1120, a first multi-exposure image acquisition timing value is determined that is used for an instance of strobed illumination. At block 1130, the recorded data indicative of the multi-exposure timing difference is used to determine a timing difference between the first multi-exposure image acquisition timing value and a second multi-exposure image acquisition timing value. At block 1140, the imaging system is operated using the periodically modulated focus position in conjunction with using the first and second multi-exposure image acquisition timing values for respective instances of strobed illumination to enhance image focus for the first and second regions of interest while acquiring a multi-exposure image of the current workpiece that includes the first and second regions of interest on the current workpiece.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for defining operations that control acquisition of a multi-exposure image provided by an instance of a type of machine vision inspection system comprising an illumination source for providing strobed illumination and an imaging system including a variable focal length lens that is utilized to periodically modulate a focus position of the imaging system over a plurality of positions along a Z height direction proximate to a workpiece, the method comprising:
  performing operations during a learn mode of a first instance of the type of machine vision inspection system to determine a multi-exposure timing difference, the learn mode operations comprising:
    defining first and second regions of interest having different Z heights on a representative workpiece;
    collecting at least one image stack comprising respective images of the first and second regions of interest on the representative workpiece focused at respective Z heights, wherein each respective image of the at least one image stack is exposed using at least one instance of strobed illumination timed to correspond with a respective phase timing of the periodically modulated focus position corresponding to focus at a respective Z height for that respective image of the at least one image stack;
    determining first and second multi-exposure timing values for instances of strobed illumination that correspond with first and second phase timings of the periodically modulated focus position that produce a sufficient image focus for the first and second regions of interest, respectively, based at least in part on an analysis of the focus of the first and second regions of interest in the at least one image stack; and
    recording data indicative of the locations of the first and second regions of interest on the representative workpiece and data indicative of a multi-exposure timing difference between the first and second multi-exposure timing values, wherein the recorded data is usable to define operations that control a multi-exposure image acquisition based at least partly on the multi-exposure timing difference when operating a using-instance of the type of machine vision inspection system to acquire a multi-exposure image of the first and second regions of interest on a current workpiece that is similar to the representative workpiece.

2. The method of claim 1, further comprising:
using the recorded data indicative of the locations of the first and second regions of interest on the representative workpiece and the multi-exposure timing difference to define operations that control a multi-exposure image acquisition provided by a using-instance of the type of machine vision inspection system, comprising:
  positioning the first and second regions of interest on a current workpiece that is similar to the representative workpiece in a field of view of the imaging system of the using-instance of the machine vision inspection system;
  determining a first multi-exposure image acquisition timing value that is used for an instance of strobed illumination;
  using the recorded data indicative of the multi-exposure timing difference to determine a timing difference between the first multi-exposure image acquisition timing value and a second multi-exposure image acquisition timing value; and
  operating the imaging system using the periodically modulated focus position in conjunction with using the first and second multi-exposure image acquisition timing values for respective instances of strobed illumination to enhance overall image focus for the first and second regions of interest while acquiring a multi-exposure image of the current workpiece that includes the first and second regions of interest on the current workpiece.

3. The method of claim 2, wherein:
the sufficient image focus is a best image focus for the first and second regions of interest on the representative workpiece, respectively; and
the first and second image acquisition multi-exposure timing values correspond with first and second phase timings of the periodically modulated focus position that produce a best image focus for the first and second regions of interest on the current workpiece, respectively.

4. The method of claim 2, wherein the recorded data is recorded in association with a part program for inspecting instances of the representative workpiece, and the using of the recorded data comprises executing the part program on the using-instance of the machine vision inspection system.

5. The method of claim 2, wherein the using-instance and the first instance of the type of machine vision inspection system are the same machine vision inspection system.

6. The method of claim 2, wherein the using-instance and the first instance of the type of machine vision inspection system are different machine vision inspection systems.

7. The method of claim 2, wherein:
the determining of the first multi-exposure image acquisition timing value includes utilizing an automatic focusing operation comprising image analysis; and
the using of the recorded data indicative of the multi-exposure timing difference to determine the timing difference between the first multi-exposure image acquisition timing value and the second multi-exposure image acquisition timing value does not include utilization of an automatic focusing operation comprising image analysis.

8. The method of claim 2, further including utilizing the multi-exposure image of the current workpiece to determine or perform workpiece feature inspection operations on the current workpiece based on image data of the multi-exposure image without using image data from an additional image, wherein the inspection operations comprise locating at least a first edge feature on the current workpiece in the first region of interest, and locating at least a second edge feature on the current workpiece in the second region of interest.

9. The method of claim 8, further including analyzing the image quality in each of the first and second regions of interest in the multi-exposure image of the current workpiece to confirm that the image focus is better than a pre-determined threshold that is related to a desired level of accuracy for the locating of the first and second edge features.

10. The method of claim 8, wherein the inspection operations further include determining a distance between the first and second edge features in the multi-exposure image of the current workpiece.

11. The method of claim 1, further comprising:
during the learn mode, operating the imaging system using the periodically modulated focus position in conjunction with using the first and second multi-exposure timing values for respective instances of strobed illumination while acquiring a multi-exposure image of the representative workpiece that includes the first and second regions of interest on the representative workpiece;
utilizing the multi-exposure image of the representative workpiece to determine workpiece feature inspection operations on the representative workpiece, wherein the inspection operations comprise locating at least a first edge feature on the representative workpiece in the first region of interest and at least a second edge feature on the representative workpiece in the second region of interest.

12. The method of claim 1, further comprising:
during the learn mode, determining a third multi-exposure timing value for an instance of strobed illumination based at least in part on an analysis of a focus of a third region of interest in the at least one image stack;
wherein the recording of the data includes recording data indicative of the location of the third region of interest on the representative workpiece and data indicative of an additional multi-exposure timing difference between the third multi-exposure timing value and at least one of the first or second multi-exposure timing values, wherein the recorded data is usable to define operations that control a multi-exposure image acquisition based at least partly on the multi-exposure timing difference and the additional multi-exposure timing difference when operating a using-instance of the type of machine vision inspection system to acquire a multi-exposure image of the first, second and third regions of interest on a current workpiece that is similar to the representative workpiece.

13. The method of claim 1, wherein, during the learn mode, the first and second regions of interest on the representative workpiece are selected utilizing a multi-exposure video tool, comprising:
a multi-exposure video tool graphical user interface (GUI) that includes elements that are utilized for defining the first and second regions of interest on the representative workpiece; and
operations for automatically determining the first and second multi-exposure timing values after the first and second regions of interest have been defined.

14. The method of claim 13, wherein, during the learn mode, the multi-exposure video tool is utilized in conjunction with at least one other video tool for locating a first workpiece feature in the first region of interest and a second workpiece feature in the second region of interest on the representative workpiece.

15. The method of claim 14, wherein the at least one other video tool includes at least one of a point tool, box tool, circle tool or arc tool and the first and second workpiece features are edge features.

16. The method of claim 1, wherein, during the learn mode, the at least one instance of strobed illumination timed to correspond with a respective phase timing of the periodically modulated focus position corresponding to focus at a respective Z height for a respective image of the at least one image stack comprises a plurality of repeated instances at the respective phase timing over multiple periods of the periodically modulated focus position.

17. The method of claim 1, wherein a sufficient image focus for the first and second regions of interest is determined according to one or more of:
an at least approximately best focus for each of the first and second regions of interest;
a determination of a focus peak for each of the first and second regions of interest and a determination of corresponding first and second multi-exposure timing values that correspond to images close to the focus peak; and
a focus sufficient for determining a dimensional measurement for inspection with a desired accuracy along the direction of an X-Y plane in the multi-exposure image.

18. A computer readable non-transitory storage medium with instructions stored thereon that are executable by a processor to perform operations of:
defining first and second regions of interest having different Z heights on a representative workpiece;
collecting at least one image stack comprising respective images of the first and second regions of interest on the representative workpiece focused at respective Z heights, wherein each respective image of the at least one image stack is exposed using at least one instance of strobed illumination timed to correspond with a respective phase timing of the periodically modulated focus position corresponding to focus at a respective Z height for that respective image of the at least one image stack;
determining first and second multi-exposure timing values for instances of strobed illumination that correspond with first and second phase timings of the periodically modulated focus position that produce a sufficient image focus for the first and second regions of interest, respectively, based at least in part on an analysis of the focus of the first and second regions of interest in the at least one image stack;

recording data indicative of the locations of the first and second regions of interest on the representative workpiece and data indicative of a multi-exposure timing difference between the first and second multi-exposure timing values, wherein the recorded data is usable to define operations that control a multi-exposure image acquisition based at least partly on the multi-exposure timing difference when acquiring a multi-exposure image of first and second regions of interest on a current workpiece that is similar to the representative workpiece.

19. The computer readable non-transitory storage medium of claim 18, wherein the operations further include:

positioning first and second regions of interest on a current workpiece that is similar to the representative workpiece;

determining a first multi-exposure image acquisition timing value that is used for an instance of strobed illumination;

using the recorded data indicative of the multi-exposure timing difference to determine a timing difference between the first multi-exposure image acquisition timing value and a second multi-exposure image acquisition timing value; and operating the imaging system using the periodically modulated focus position in conjunction with using the first and second multi-exposure image acquisition timing values for respective instances of strobed illumination to enhance overall image focus for the first and second regions of interest while acquiring a multi-exposure image of the current workpiece that includes the first and second regions of interest on the current workpiece.

20. A machine vision inspection system, comprising:

an illumination source for providing strobed illumination;

an imaging system including a variable focal length lens that is utilized to periodically modulate a focus position of the imaging system over a plurality of positions along a Z height direction proximate to a workpiece;

a memory for storing programmed instructions; and a processor configured to execute the programmed instructions to perform operations including:

defining first and second regions of interest having different Z heights on a representative workpiece;

collecting at least one image stack comprising respective images of the first and second regions of interest on the representative workpiece focused at respective Z heights, wherein each respective image of the at least one image stack is exposed using at least one instance of strobed illumination timed to correspond with a respective phase timing of the periodically modulated focus position corresponding to focus at a respective Z height for that respective image of the at least one image stack;

determining first and second multi-exposure timing values for instances of strobed illumination that correspond with first and second phase timings of the periodically modulated focus position that produce a sufficient image focus for the first and second regions of interest, respectively, based at least in part on an analysis of the focus of the first and second regions of interest in the at least one image stack; and recording data indicative of the locations of the first and second regions of interest on the representative workpiece and data indicative of a multi-exposure timing difference between the first and second multi-exposure timing values, wherein the recorded data is usable to define operations that control a multi-exposure image acquisition based at least partly on the multi-exposure timing difference when acquiring a multi-exposure image of first and second regions of interest on a current workpiece that is similar to the representative workpiece.

* * * * *